United States Patent
Fabes et al.

(10) Patent No.: US 9,768,976 B2
(45) Date of Patent: Sep. 19, 2017

(54) AUTOMATIC COLLECTION AND UPDATING OF COMPLIANCE DATA FOR GAS DETECTION EQUIPMENT

(75) Inventors: Emily Fabes, Calgary (CA); Dale Broemer, Okotoks (CA); Steve Worthington, Calgary (CA)

(73) Assignee: Honeywell International Inc., Morristown, NJ (US)

( * ) Notice: Subject to any disclaimer, the term of this patent is extended or adjusted under 35 U.S.C. 154(b) by 1431 days.

(21) Appl. No.: 13/350,283

(22) Filed: Jan. 13, 2012

(65) Prior Publication Data

US 2013/0185000 A1    Jul. 18, 2013

(51) Int. Cl.
G01N 21/3504    (2014.01)
H04L 12/28    (2006.01)

(52) U.S. Cl.
CPC .. H04L 12/2825 (2013.01); *H04L 2012/2841* (2013.01)

(58) Field of Classification Search
USPC ......................................................... 702/24
See application file for complete search history.

(56) References Cited

U.S. PATENT DOCUMENTS

| | | | | |
|---|---|---|---|---|
| 7,245,380 | B2* | 7/2007 | Kosterev | 356/437 |
| 9,030,329 | B2* | 5/2015 | Rutherford | G08B 21/16 340/632 |
| 2003/0058131 | A1* | 3/2003 | Grisham | B61L 29/246 340/907 |
| 2004/0075566 | A1* | 4/2004 | Stepanik et al. | 340/632 |
| 2008/0084329 | A1* | 4/2008 | Davies | 340/870.02 |
| 2010/0192683 | A1* | 8/2010 | Elkins | 73/152.18 |
| 2012/0260719 | A1* | 10/2012 | Schade | 73/24.02 |

* cited by examiner

*Primary Examiner* — Aditya Bhat
(74) *Attorney, Agent, or Firm* — Wood, Phillips, Katz, Clark & Mortimer

(57) ABSTRACT

A gas detection unit capable of automatically communicating event data is provided. The unit includes a housing, a gas detector module mounted in the housing, and a programmable processor configured to retain preselected event data of the gas detector module and to automatically initiate a wireless signal communicating the preselected event data for further transmission to a remote database in response to the detection of an available communication connection. The unit can include a low power radio module configured to transmit a low power radio signal communicating the preselected event data in response to initiation of the wireless signal by the programmable processor.

20 Claims, 1 Drawing Sheet

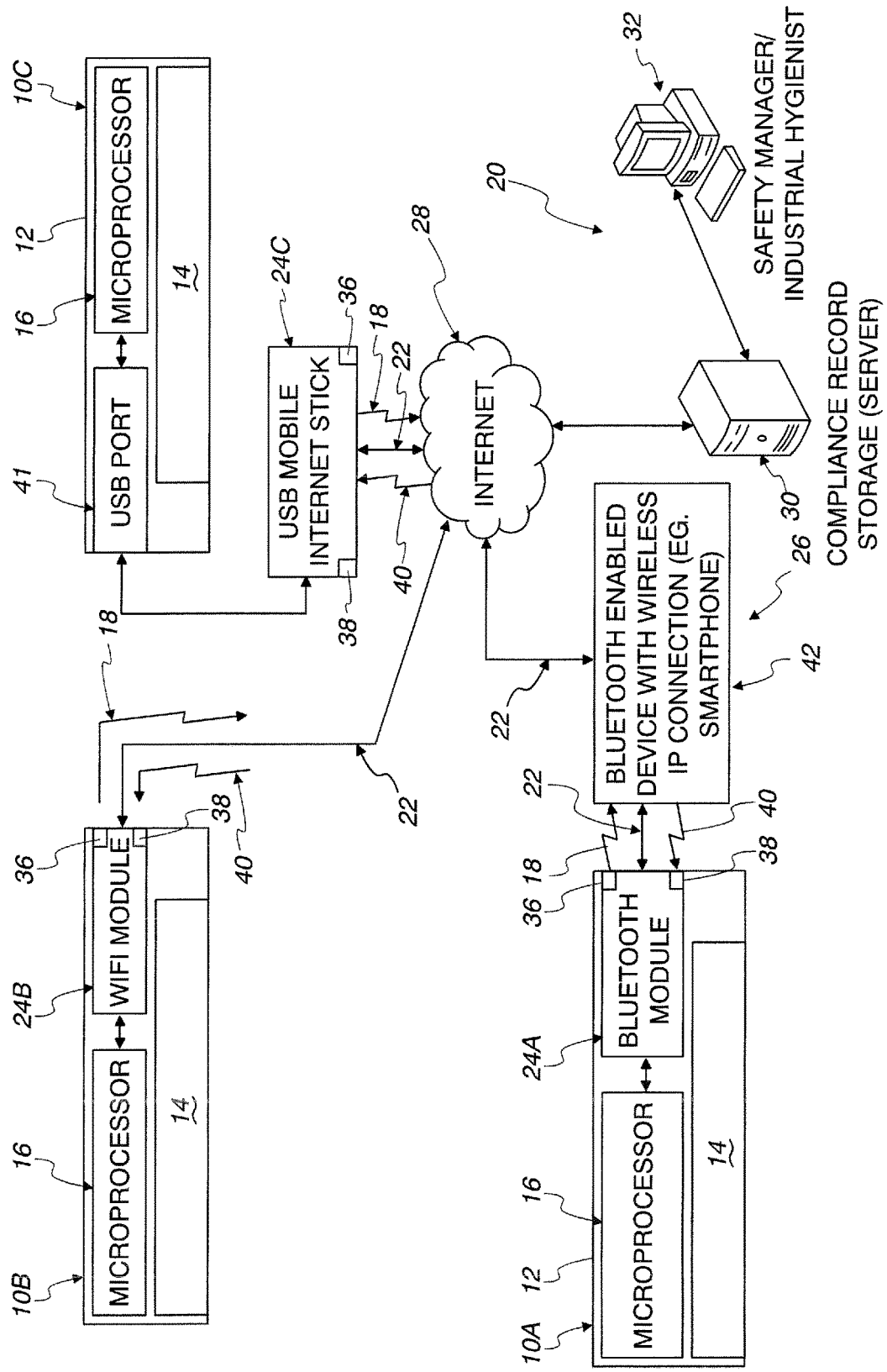

AUTOMATIC COLLECTION AND UPDATING OF COMPLIANCE DATA FOR GAS DETECTION EQUIPMENT

FIELD

This invention relates to gas detection equipment and systems and methods for managing/maintaining such systems.

BACKGROUND

Companies in most parts of the world have to follow government regulations and/or company policy about the use of gas detection equipment. Typically, this includes being able to show that they are compliant to these regulations and/or policies. In order to show compliance the safety manager must maintain records about the status of the gas detection equipment, including any operational failures, and be aware of any configuration changes that have been made. This data can be stored as a hardcopy or in an electronic database.

In many situations this data is not easy to collect. For remote or mobile workers in particular, the data is often stored on the gas detection unit or docking equipment and is not easily transferred to the central database storage location for recall and/or review by the safety manager. This means that the data may be infrequently transferred, and the safety manager's records are often not up to date.

Additionally, sometimes there are changes to government regulations or to company policy that require the gas detection unit's configuration be changed (e.g. Alarm set point is lowered to be cautious). For remote or mobile workers, updating these settings can be challenging because the gas detection equipment may infrequently make it back to the office for where the safety manager works so that the equipment can be updated.

Furthermore, the designs of gas detection units have to be certified to be intrinsically safe (IS) so that they can be used in an environment with flammable gas. This inherently places many restrictions on the designs of such units.

SUMMARY

In accordance with one feature of the application, a gas detection unit capable of automatically communicating event data is provided. The unit includes a housing, a gas detector module mounted in the housing, and a programmable processor configured to retain preselected event data of the gas detector module and to automatically initiate a wireless signal communicating the preselected event data for further transmission to a remote database in response to the detection of an available communication connection.

As one feature, the unit further includes a low power radio module configured to transmit a low power radio signal communicating the preselected event data in response to initiation of the wireless signal by the programmable processor.

In one feature, the low power radio module includes a wireless receiver configured to receive a low power radio signal, and the programmable processor is configured to automatically initiate the wireless signal communicating the preselected event data in response to the detection of the low power radio signal by the wireless receiver.

According to one feature, the low power radio module is configured to transmit in the ISM band from 2400 to 2800 MHZ.

In one feature, the low power radio module is configured to operate under Bluetooth protocols.

As one feature, the low power radio module is configured to operate under ultra-wide band protocols.

According to one feature, the low power radio module is configured to operate under wireless local area network protocols.

As one feature, the low power radio module is configured to operate under IEEE 802.11 standards.

According to one feature, the programmable processor is configured to automatically confirm that the preselected event data has been successfully received by the remote database.

In one feature, the programmable processor is configured to automatically update one or more parameters in response to a received wireless signal providing the one or more parameters. As a further feature, the one or more parameters comprise data that alters a list of preselected events retained by the programmable processor or an operational setting of the gas detector module.

In one feature, the programmable processor and the low power radio module are mounted in the housing.

In accordance with one feature of the application, a method is provided for managing a gas detection unit. The method includes the steps of retaining preselected event data in a gas detection unit, and automatically transmitting the preselected event data via a wireless signal in response to the detection of a wireless communications connection.

As one feature, the step of automatically transmitting includes transmitting the preselected event data via a low power wireless signal emitted from the gas detection unit.

In a further feature, the step of automatically transmitting further includes transmitting the preselected event data to the remote database via an internet connection.

According to one feature, the step of automatically transmitting further includes receiving the low power wireless signal in a device distinct from the gas detection unit and retransmitting the preselected event data via a high power wireless signal emitted from the device. As a further feature, the step of automatically transmitting further includes transmitting the preselected event data from the device to the remote database via an internet connection.

As one feature, the method further includes transmitting a wireless signal back to the gas detection unit indicating that the preselected event data has been received by the remote database.

In one feature, the method further includes transmitting a signal back to the gas detection unit providing updated parameters for the gas detection unit. In a further feature, the method further includes updating at least one of an operational setting of the gas detection unit or a list of preselected event data to be retained in the gas detection unit for later transmission therefrom in response to the updated parameters.

Other features and advantages will become apparent from a review of the entire specification, including the appended claims and drawings.

BRIEF DESCRIPTION OF THE DRAWINGS

FIG. 1 is a diagrammatic illustration of a system and method for automatic collection and updating of compliance data for gas detection equipment, including several embodiments of gas detector units according to the application.

DETAILED DESCRIPTION

Several embodiments of gas detection units are shown diagrammatically at 10 in FIG. 1, with each gas detection unit 10 being capable of automatically communicating event data, such as, for example, data pertaining to the status of the unit 10, operational failures of the unit 10, configuration changes of the unit 10, gas exposures of the unit 10, testing of the unit 10, and/or recalibration of the unit 10, any or all of which may be required as compliance data. In the illustrated embodiments, each of the gas detection units 10 includes a housing 12, a gas detector module 14 mounted in the housing and capable of detecting one or more predetermined gases, and a programmable processor in the form of a microprocessor 16 mounted in the housing 10. The processor 16 is configured to retain preselected event data of the gas detector module 14 and to automatically initiate a wireless signal, shown schematically at 18, communicating the preselected event data for further transmission to a remote database or databases 20 in response to the detection of an available wireless communication connection, shown generally at 22.

Each of the illustrated embodiments further includes a low power radio module 24 configured to transmit the wireless signal 18 in the form of a lower power radio signal 18, communicating the preselected event data in response to initiation of the wireless signal 18 by the programmable processor 16. As used herein, the term low power radio signal is intended to indicate relatively low power radio signals that are capable of reliable communications over distances typically limited to around 100 yards or less, such as signals operating according to Bluetooth protocols in the ISM band from 2400 to 2800 megahertz, signals operating according to Zigbee protocols such as IEEE 802.15.4, signals operating under ultra-wide band protocols, such as IEEE 802.14.4a, and signals operating under so-called Wi-Fi or wireless local area network protocols, such as signals operating under IEEE 802.11 standards, and which are distinguished from relatively high power radio signals that are capable of reliable communications over distances typically of one third of a mile or greater, such as signals operating under cellular phone protocols, Citizen Band radio protocols (CB radio), Family Radio Service (FRS) protocols, General Mobile Radio Services (GMRS) protocols, or amateur Ham radio protocols.

In the illustrated embodiments, the preselected event data communicated via the wireless signal 18 is further transmitted via a communication network, such as, for example, via a cellular phone system, shown generally at 26 and/or the Internet 28 (such as under the standard internet protocol suite (TCP/IP)) to the remote database or databases 20 which can reside, for example, in a storage server 30 and/or a locally based computer 32 for current and future review by a safety manager.

In the illustrated embodiments, each of the low power radio modules 24 include a wireless transmitter 36 configured to transmit the low power radio signal 18, and a wireless receiver 38 configured to receive a low power radio signal, shown schematically at 40, with the programmable processor 16 being configured to automatically initiate the low power radio signal 18 in response to detection of the low power radio signal 40 by the wireless receiver 38.

In the embodiment 10A of FIG. 1, the low power wireless module 26 is mounted in the housing 12 and configured as a BLUETOOTH® module 26A that operates according to Bluetooth protocols. In this regard, the module 26A transmits and receives in the ISM radio bands from 2400 to 2800 megahertz.

The low power wireless module 24 in the embodiment 10B of FIG. 1 is mounted in the housing 12 and provided in the form of a Wi-Fi module 24B that can be configured to operate under wireless local area network (WLAN) protocols, such as IEEE 802.11 standards, and/or under ultra-wide band (UWB) protocols, such as IEEE 802.15.4a, for communications with the internet 28.

The low power radio module 24 of the embodiment 10C in FIG. 1 is provided in the form of a USB mobile radio module 24C that is releasably connected into a USB port 41 in the housing 12. The USB module 24C is a Wi-Fi module similar to the module 24B.

In each of the illustrated embodiments, the programmable processor 16 is further configured to automatically confirm that the preselected event data has been successfully received by the remote database 20. This will include the receipt of an express confirmation of successful receipt by the database 20 via the wireless signal 40.

The programmable processor 16 in each of the embodiments can also be configured to automatically update one or more parameters in response to a received wireless signal 40 providing the one or more parameters. In this regard, the one or more parameters can include, for example, a list of the preselected events to be retained by the programmable processor 16, and/or alterations to the operational settings of the gas detector module 14. Additionally, the illustrated systems can also be configured such that the configuration settings of each of the gas detector units 10 are confirmed as correct in response to the low power radio signal 18 transmitting the current configuration settings of the gas detector unit 10.

In operation, the microprocessor 16 in each of the illustrated units 10 automatically stores a record of the preselected event data and automatically transmits the preselected event data from the unit 10 via the wireless signal 18 in response to the detection of the wireless communications connection 22. For example, a user of embodiment 10A may be driving around to different remote facilities and at least one of the facilities has a gas exposure event that is stored by the microprocessor 16 as one of the preselected events. When the user returns to his vehicle, where he has left his cellular phone 42 because it is not IS and cannot be in a hazardous environment, the gas detection unit 10A detects a wireless communications connection 22 via a BLUETOOTH® connection 22 and the microprocessor 16 automatically transmits the preselected event data from the gas detector unit 10A via the wireless signal 18 to the cell phone 42, which data is further transmitted via the cell phone 42 through the cellular network 26 to the internet 28 and then via the internet 28 to the database 20 for future or current review by a safety manager. As another example, a user of embodiments 10B or 10C visits several facilities and at least at one of the facilities has a gas exposure event that is stored by the microprocessor 16 as one of the preselected events. Some time during the day the user stops at a coffee shop with a publicly available Wi-Fi system and the gas detection unit 10B or 10C detects the wireless communications connection 22 and in response thereto the microprocessor 16 automatically transmits the preselected event data from the gas detection unit 10B or 10C to the Internet 28 via the publicly available Wi-Fi system at the coffee shop, with the data then being further transmitted via the internet 28 to the database 20 for current or future review by a safety manager.

It should be appreciated that the low power radio modules 24A, 24B, 24C could take on other suitable forms than those expressly described, such as for example, it could be a low power radio module configured to operate according to Zigbee under IEEE 802.15.4 standards or to operate under proprietary low power radio signal protocols.

It should be appreciated that there are many known and suitable types, forms, and constructions for each of the components 14, 16, 20, 24A-24C, 30, 32, and 41 that can be utilized in the systems and method described herein and that the details of such components are not critical to the systems and methods described herein. Furthermore, it should be understood that while specific embodiments have been shown and described above, there are other possible alternatives. For example, while each embodiment of the unit 10 the low power wireless modules 24 have been shown and described as being mounted in or on the housing 12, it may be desirable in some applications for the low power wireless module 24 to be included in a docking module or station for the unit 10, of which many suitable types, forms, and constructions are known, with the microprocessor 16 of the unit 10 initiating the low power radio module 24 when the gas detection unit 10 is docked with the docking module and an wireless communications connection is sensed by the module 24. Alternatively, the programmable processor 16 can also be configured to transmit the event data to another programmable processor in the docking station whenever the gas detector unit 10 is docked with the docking station and the processor in the docking station can be configured to initiate the wireless signal in response to detection of a wireless communication connection 22. Further, if the docking station can accept multiple units 10, the units 10 can share the low power radio module 24 and the processor in the docking station. Accordingly, limitations to the specific embodiments illustrated and described herein should not be read into any appended claim unless expressly recited in the claim.

It should be appreciated that by providing the programmable processor to retain preselected event data of the gas detector module and to automatically initiate a wireless signal communicating the preselected event to a remote database, the systems and methods disclosed herein provide a convenient, dependable method for a safety manager to maintain appropriate compliance records and to stay up-to-date on the status of the gas detection units. It should also be appreciated that by providing the low power radio module 24 in the housing 12 of the gas detector unit 10, the gas detector unit 10 can still maintain its battery life while being certified to be intrinsically safe (IS) because the low power radio module 24 will not require an unduly large battery to provide a run time long enough for a shift.

The invention claimed is:

1. A gas detection unit capable of automatically communicating event data, the unit comprising:
   a housing;
   a gas detector module mounted in the housing; and
   a programmable processor configured to retain preselected event data of the gas detector module and to automatically initiate a wireless signal communicating the preselected event data to a remote database in response to the detection of an available communication connection, wherein the preselected event data includes at least one of: operational failures of the unit, testing of the unit and recalibration of the unit.

2. The unit of claim 1 further comprising a low power radio module configured to transmit a low power radio signal communicating the preselected event data in response to initiation of the wireless signal by the programmable processor.

3. The unit of claim 2 wherein the low power radio module comprises a wireless receiver configured to receive a low power radio signal, and wherein the programmable processor is configured to automatically initiate the wireless signal communicating the preselected event data in response to the detection of low power radio signal by the wireless receiver.

4. The unit of claim 2 wherein the low power radio module is configured to transmit in the ISM band from 2400 to 2800 MHZ.

5. The unit of claim 2 wherein the low power radio module is configured to operate under Bluetooth protocols.

6. The unit of claim 2 wherein the low power radio module is configured to operate under ultra-wide band protocols.

7. The unit of claim 2 wherein the low power radio module is configured to operate under wireless local area network protocols.

8. The unit of claim 2 wherein the low power radio module is configured to operate under IEEE 802.11 standards.

9. The unit of claim 1 wherein the programmable processor is configured to automatically confirm that the preselected event data has been successfully received by the remote database.

10. The unit of claim 1 wherein the programmable processor is configured to automatically update one or more parameters in response to a received wireless signal providing the one or more parameters.

11. The unit of claim 10 wherein the one or more parameters comprise data that alters an operational setting of the gas detector module.

12. The unit of claim 10 wherein the programmable processor and the low power radio module are mounted to the housing.

13. A method of managing a gas detection unit, the method comprising the steps of:
    retaining preselected event data in a gas detection unit, wherein the preselected event data includes at least one of: operational failures of the unit, testing of the unit, and recalibration of the unit; and
    automatically transmitting the preselected event data via a wireless signal in response to the detection of a wireless communications connection.

14. The method of claim 13 wherein the step of automatically transmitting comprises transmitting the preselected event data via a low power wireless signal emitted from the gas detection unit.

15. The method of claim 14 wherein the step of automatically transmitting further comprises transmitting the preselected event data to the remote database via an internet connection.

16. The method of claim 14 wherein the step of automatically transmitting further comprises receiving the low power wireless signal in a device distinct from the gas detection unit and retransmitting the preselected event data via a high power wireless signal emitted from the device.

17. The method of claim 16 wherein the step of automatically transmitting further comprises transmitting the preselected event data from the device to the remote database via an internet connection.

18. The method of claim 13 further comprising transmitting a wireless signal back to the gas detection unit indicating that the preselected event data has been received by the remote database.

19. The method of claim 13 further comprising transmitting a signal back to the gas detection unit providing updated parameters for the gas detection unit.

20. The method of claim 19 further comprising updating at least one operational setting of the gas detection unit in response to the updated parameters.

\* \* \* \* \*